(No Model.)

C. ALLEN.
FRUIT PICKING IMPLEMENT.

No. 258,846. Patented May 30, 1882.

WITNESSES=
Joseph O'Connor
Henry Harrison

INVENTOR=
Charles Allen

UNITED STATES PATENT OFFICE.

CHARLES ALLEN, OF ROCHESTER, NEW YORK.

FRUIT-PICKING IMPLEMENT.

SPECIFICATION forming part of Letters Patent No. 258,846, dated May 30, 1882.

Application filed December 21, 1881. (No model.)

*To all whom it may concern:*

Be it known that I, CHARLES ALLEN, a British subject, residing at No. 36 Elizabeth street, in the city of Rochester, in the county of Monroe and State of New York, have invented a new and useful Fruit-Picking Implement or Device, of which the following is a specification.

My invention relates to an improvement in methods of picking apples, pears, and other fruits; and its objects are, first, to enable the picker to conduct the operation of picking from the ground without climbing the tree, or the use of ladders or scaffolding; and, second, to convey the fruit to the basket on the ground rapidly and directly without bruising. I attain these objects by the implement illustrated in the following drawings, in which—

Figure 1:
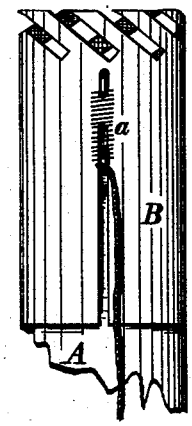
Figure 2:
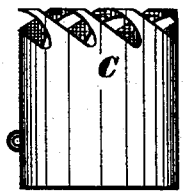
Figure 3:
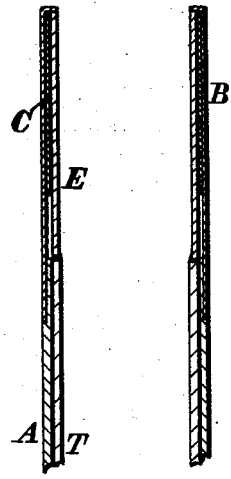
Figure 4:
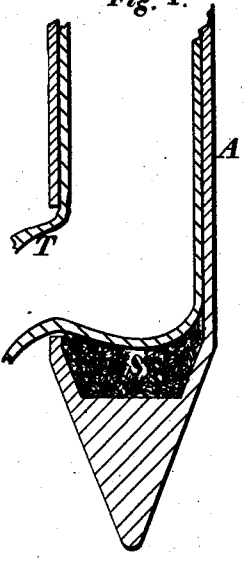

Figure 3 is a vertical section of the upper portion of the implement; Fig. 4, a vertical section of the lower portion; Fig. 1, a view of the sliding and notched clipping-knife, and Fig. 2 a view of the double cylinder in which it slides.

Similar letters refer to similar parts throughout the several figures.

The cylinder A is a long light hollow handle composed of several sections, and of a diameter sufficient to allow the fruit to be picked to pass through it. It is lined with the soft lining T, and is closed at the bottom, where the fruit slides down onto the sponge S and comes out at an opening in the side. At the upper end of this hollow handle A is fixed a double metal cylinder, B and E, (represented in the vertical section in Fig. 3,) with the top notched, as represented in Fig. 1. Within this double cylinder slides the notched cylindrical knife C. (Shown in detail in Fig. 2, and represented in place in the vertical section, Fig. 3.) Represented in Fig. 1 is the spring *a*, by which the notched knife C is lifted into place when pulled down by the wire represented in that figure, which works in a slot in the double notched metal cylinder B and E and passes down the hollow handle A to the operator's hand.

The fruit-picker is used by an operator standing on the ground, who adjusts the upper end or metallic mouth-piece to the fruit on the branch. A turn of the hollow handle A brings the stem of the fruit into one of the notches of the double cylinder B and E. (Represented in Fig. 1.) The operator then pulls the wire connecting with the notched knife C, which slides down and cuts the stem, and the fruit falls down through the hollow handle A, striking on the sponge S, and comes out at the side opening.

What I claim as my invention, and desire to secure by Letters Patent, is—

1. In a fruit-picking implement, the combination of the notched cylindrical knife C, sliding within the double notched cylinder E B, kept in place by the spring *a* and operated by means of a wire leading downward from the spring, all substantially as shown and described, for the purpose specified.

2. In a fruit-picking implement, the combination of the hollow handle A with the notched cylindrical knife C and the double notched cylinder B E, substantially as and for the purpose set forth.

CHARLES ALLEN.

Witnesses:
JOSEPH O'CONNOR,
HENRY HARRISON.